(12) United States Patent
Wang et al.

(10) Patent No.: US 12,451,280 B2
(45) Date of Patent: Oct. 21, 2025

(54) DRIVING MECHANISM

(71) Applicant: TDK TAIWAN CORP., Taoyuan (TW)

(72) Inventors: Guan-Bo Wang, Taoyuan (TW); Yi-Chi Hsieh, Taoyuan (TW); Chen-Hsin Huang, Taoyuan (TW); Kai-Po Fan, Taoyuan (TW); Sheng-Chang Lin, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 477 days.

(21) Appl. No.: 17/971,779

(22) Filed: Oct. 24, 2022

(65) Prior Publication Data

US 2023/0129823 A1  Apr. 27, 2023

Related U.S. Application Data

(60) Provisional application No. 63/270,806, filed on Oct. 22, 2021.

(51) Int. Cl.

| | | |
|---|---|---|
| *G02B 7/04* | (2021.01) | |
| *G02B 7/00* | (2021.01) | |
| *G02B 7/02* | (2021.01) | |
| *G02B 7/08* | (2021.01) | |
| *G02B 7/09* | (2021.01) | |
| *G02B 27/64* | (2006.01) | |
| *G03B 9/14* | (2021.01) | |
| *H01F 7/08* | (2006.01) | |
| *H01F 7/16* | (2006.01) | |

(Continued)

(52) U.S. Cl.
CPC .............. *H01F 7/081* (2013.01); *G02B 7/008* (2013.01); *G02B 7/02* (2013.01); *G02B 7/023* (2013.01); *G02B 7/04* (2013.01); *G02B 7/08* (2013.01); *G02B 27/646* (2013.01); *G03B 9/14* (2013.01); *H01F 7/16* (2013.01); *H04N 23/51* (2023.01); *H04N 23/54* (2023.01); *H04N 23/55* (2023.01)

(58) Field of Classification Search
CPC . G02B 7/09; G02B 7/005; G02B 7/04; G02B 7/10; G02B 27/64; G02B 27/646; G02B 13/001; G02B 7/023; G02B 7/08; G03B 5/00; G03B 13/34; G03B 13/36; G03B 13/32; G03B 2205/0069; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC ........... 359/822, 823, 824, 694, 813; 396/89
See application file for complete search history.

(56) References Cited

U.S. PATENT DOCUMENTS

| | | | |
|---|---|---|---|
| 9,143,690 B2 * | 9/2015 | Hu | .......................... G02B 7/102 |
| 9,341,860 B2 * | 5/2016 | Wu | ....................... G02B 27/646 |

(Continued)

FOREIGN PATENT DOCUMENTS

CN                213122398 U        5/2021

*Primary Examiner* — Marin Pichler
(74) *Attorney, Agent, or Firm* — MUNCY, GEISSLER, OLDS & LOWE, P.C.

(57) ABSTRACT

A driving mechanism is provided, including a fixed part, a movable part, and a driving assembly. The movable part is movably connected to the fixed part for holding an optical element, wherein the optical element defines an optical axis. The driving assembly is configured to drive the movable part to move relative to the fixed part.

24 Claims, 17 Drawing Sheets

(51) Int. Cl.
*H04N 23/51* (2023.01)
*H04N 23/54* (2023.01)
*H04N 23/55* (2023.01)

(56) References Cited

U.S. PATENT DOCUMENTS

| | | | |
|---|---|---|---|
| 9,904,072 B2* | 2/2018 | Fan | H02K 41/0356 |
| 10,030,732 B2* | 7/2018 | Chiu | F16F 1/18 |
| 10,359,599 B2* | 7/2019 | Hsu | G02B 7/08 |
| 10,423,005 B2* | 9/2019 | Hu | G02B 27/646 |
| 10,495,897 B2* | 12/2019 | Kuo | G02B 27/646 |
| 10,585,261 B2* | 3/2020 | Moto | G02B 7/021 |
| 10,718,952 B2* | 7/2020 | Lee | G02B 7/09 |
| 10,739,608 B2* | 8/2020 | Moto | G02B 7/023 |
| 10,761,291 B2* | 9/2020 | Kuo | H04N 23/687 |
| 10,816,874 B2* | 10/2020 | Hsu | G03B 17/12 |
| 10,866,394 B2* | 12/2020 | Yu | G02B 27/646 |
| 10,901,171 B2* | 1/2021 | Kuo | G02B 7/09 |
| 10,921,494 B2* | 2/2021 | Kao | G09G 5/003 |
| 10,935,809 B2* | 3/2021 | Hu | G02B 7/09 |
| 10,962,735 B2* | 3/2021 | Wang | H02K 41/0356 |
| 11,070,152 B2* | 7/2021 | Chan | G02B 7/09 |
| 11,126,068 B2* | 9/2021 | Hu | G03B 3/10 |
| 11,131,827 B2* | 9/2021 | Hu | G02B 27/646 |
| 11,175,475 B2* | 11/2021 | Hu | G02B 7/023 |
| 11,187,965 B2* | 11/2021 | Hu | H04N 23/54 |
| 11,226,466 B2* | 1/2022 | Wang | G03B 30/00 |
| 11,226,469 B2* | 1/2022 | Fan | G02B 27/646 |
| 11,226,542 B2* | 1/2022 | Wu | H04N 23/55 |
| 11,256,059 B2* | 2/2022 | Wu | G02B 7/023 |
| 11,256,066 B2* | 2/2022 | Hu | G02B 13/0065 |
| 11,262,527 B2* | 3/2022 | Yang | G02B 7/04 |
| 11,287,605 B2* | 3/2022 | Huang | G03B 13/36 |
| 11,294,140 B2* | 4/2022 | Wu | G02B 7/09 |
| 11,294,141 B2* | 4/2022 | Kao | H02K 41/0354 |
| 11,294,143 B2* | 4/2022 | Wang | G03B 5/00 |
| 11,300,755 B2* | 4/2022 | Huang | G02B 7/04 |
| 11,300,757 B2* | 4/2022 | Lin | G02B 7/08 |
| 11,300,761 B2* | 4/2022 | Hu | G01S 7/4817 |
| 11,300,803 B2* | 4/2022 | Lin | G02B 7/09 |
| 11,300,804 B2* | 4/2022 | Chan | H02K 41/0354 |
| 11,314,031 B2* | 4/2022 | Hu | H04N 23/60 |
| 11,314,101 B2* | 4/2022 | Chan | G02B 7/02 |
| 11,314,102 B2* | 4/2022 | Hu | G03B 3/10 |
| 11,333,847 B2* | 5/2022 | Hu | G03B 3/10 |
| 11,340,418 B2* | 5/2022 | Wu | H04N 23/687 |
| 11,360,284 B2* | 6/2022 | Hu | G02B 26/02 |
| 11,397,369 B2* | 7/2022 | Wu | G02B 27/0068 |
| 11,397,370 B2* | 7/2022 | Yu | G03B 5/02 |
| 11,402,603 B2* | 8/2022 | Yu | G02B 7/09 |
| 11,422,330 B2* | 8/2022 | Hu | H02K 41/0356 |
| 11,422,332 B2* | 8/2022 | Ho | H02K 41/0354 |
| 11,424,374 B2* | 8/2022 | Hu | H10F 39/804 |
| 11,448,852 B2* | 9/2022 | Hu | G02B 7/04 |
| 11,467,364 B2* | 10/2022 | Wang | G02B 7/08 |
| 11,493,728 B2* | 11/2022 | Hu | G03B 3/10 |
| 11,506,862 B2* | 11/2022 | Yang | G03B 3/10 |
| 11,520,160 B2* | 12/2022 | Hu | G02B 26/0816 |
| 11,528,394 B2* | 12/2022 | Liu | G03B 5/00 |
| 11,531,182 B2* | 12/2022 | Hu | H04N 23/55 |
| 11,550,111 B2* | 1/2023 | Huang | G02B 7/005 |
| 11,555,976 B2* | 1/2023 | Wu | G02B 7/08 |
| 11,555,981 B2* | 1/2023 | Hu | H04N 23/57 |
| 11,619,799 B2* | 4/2023 | Lin | G01L 1/16 348/373 |
| 11,624,936 B2* | 4/2023 | Wu | H02K 41/0356 359/823 |
| 11,630,280 B2* | 4/2023 | Hu | G02B 7/02 359/822 |
| 11,630,282 B2* | 4/2023 | Chen | G02B 7/08 359/823 |
| 11,630,319 B2* | 4/2023 | Hu | G02B 27/646 359/557 |
| 11,650,481 B2* | 5/2023 | Wu | G03B 3/02 359/811 |
| 11,656,531 B2* | 5/2023 | Hu | G02B 27/646 359/824 |
| 11,681,114 B2* | 6/2023 | Tang | G02B 7/02 359/823 |
| 11,681,118 B2* | 6/2023 | Shen | G02B 27/646 359/824 |
| 11,681,156 B2* | 6/2023 | Hu | G02B 13/0065 359/554 |
| 11,693,293 B2* | 7/2023 | Wang | G02B 7/04 348/335 |
| 11,711,597 B2* | 7/2023 | Huang | G02B 27/646 |
| 11,719,996 B2* | 8/2023 | Hu | G02B 7/285 359/696 |
| 11,726,390 B2* | 8/2023 | Weng | G02B 7/09 396/489 |
| 11,740,428 B2* | 8/2023 | Hung | G02B 27/646 396/448 |
| 11,796,348 B2* | 10/2023 | Liu | G01D 5/145 |
| 11,809,012 B2* | 11/2023 | Chan | G02B 7/08 |
| 11,809,013 B2* | 11/2023 | Ryoo | G03B 13/36 |
| 11,815,736 B2* | 11/2023 | Hu | G02B 7/10 |
| 11,852,886 B2* | 12/2023 | Hu | G02B 7/003 |
| 11,860,443 B2* | 1/2024 | Hu | G02B 7/08 |
| 11,867,969 B2* | 1/2024 | Ryoo | H02N 2/025 |
| 11,874,522 B2* | 1/2024 | Huang | H04N 23/51 |
| 11,888,374 B2* | 1/2024 | Hu | H02N 2/062 |
| 11,892,656 B2* | 2/2024 | Hu | G02B 7/09 |
| 11,906,810 B2* | 2/2024 | Wang | G01B 7/003 |
| 11,914,116 B2* | 2/2024 | Weng | G02B 7/1805 |
| 11,934,027 B2* | 3/2024 | Hu | G02B 7/08 |
| 11,947,180 B2* | 4/2024 | Hu | G02B 7/021 |
| 11,947,182 B2* | 4/2024 | Hu | H04N 23/687 |
| 11,988,847 B2* | 5/2024 | Wang | H02K 11/215 |
| 11,991,436 B2* | 5/2024 | Wang | H02K 41/0354 |
| 12,061,372 B2* | 8/2024 | Liu | G02B 7/08 |
| 12,130,546 B2* | 10/2024 | Hu | G03B 3/10 |
| 12,153,330 B2* | 11/2024 | Wu | G02B 7/04 |
| 12,159,752 B2* | 12/2024 | Hu | H04N 23/51 |
| 12,164,172 B2* | 12/2024 | Wang | G03B 9/02 |
| 12,165,503 B2* | 12/2024 | Wang | G02B 5/005 |
| 12,181,631 B2* | 12/2024 | Hu | H10N 30/802 |
| 12,189,205 B2* | 1/2025 | Lin | G02B 27/646 |
| 12,204,170 B2* | 1/2025 | Liu | G03B 5/02 |
| 12,204,239 B2* | 1/2025 | Hu | G02B 7/102 |
| 12,210,208 B2* | 1/2025 | Chang | G02B 7/08 |
| 12,235,510 B2* | 2/2025 | Lin | G02B 7/023 |
| 12,235,512 B2* | 2/2025 | Weng | H04N 23/55 |
| 12,235,571 B2* | 2/2025 | Shen | G03B 30/00 |
| 2013/0215526 A1* | 8/2013 | Park | H02K 41/0356 310/12.16 |
| 2020/0033626 A1* | 1/2020 | Wu | G02B 7/023 |
| 2020/0363606 A1* | 11/2020 | Huang | G02B 7/04 |
| 2020/0393642 A1* | 12/2020 | Hu | H01F 7/066 |
| 2021/0063763 A1* | 3/2021 | Wu | G03B 30/00 |
| 2021/0080683 A1* | 3/2021 | Wu | G03B 3/10 |
| 2021/0109314 A1* | 4/2021 | Lin | G02B 7/08 |
| 2021/0124143 A1* | 4/2021 | Wu | G02B 27/646 |
| 2021/0124144 A1* | 4/2021 | Chen | G02B 7/09 |
| 2021/0173172 A1* | 6/2021 | Shen | G02B 27/646 |
| 2022/0082785 A1* | 3/2022 | Liu | H04N 23/55 |
| 2022/0132002 A1* | 4/2022 | Huang | G02B 7/09 |
| 2022/0132003 A1* | 4/2022 | Huang | F03G 7/0665 |
| 2022/0221680 A1* | 7/2022 | Shen | H01F 7/066 |
| 2022/0269037 A1* | 8/2022 | Fan | G03B 5/00 |
| 2023/0129823 A1* | 4/2023 | Wang | G02B 7/04 359/824 |
| 2023/0266603 A1* | 8/2023 | Hsu | G03B 13/36 359/824 |
| 2024/0329361 A1* | 10/2024 | Lin | G02B 7/09 |
| 2025/0028150 A1* | 1/2025 | Wu | G02B 27/646 |
| 2025/0044547 A1* | 2/2025 | Chen | G02B 7/08 |
| 2025/0044605 A1* | 2/2025 | Fan | G02B 7/09 |

* cited by examiner

DRIVING MECHANISM

CROSS REFERENCE TO RELATED APPLICATIONS

This application claims the benefit of U.S. Provisional Application No. 63/270,806, filed Oct. 22, 2021, the entirety of which is incorporated by reference herein.

BACKGROUND OF THE INVENTION

Field of the Invention

The present invention relates to a driving mechanism, and, in particular, to an driving mechanism for moving an optical element.

Description of the Related Art

As technology has advanced, a lot of electronic devices (for example, laptop computers and smartphones) have incorporated the functionality of taking photographs and recording video. These electronic devices have become more commonplace, and have been developed to be more convenient and thin. More and more options are provided for users to choose from.

In some electronic devices, several coils and magnets are usually used for adjusting the focus of a lens and performing the function of Optical Image Stabilization (OIS). Light can propagate through the lens to an image sensor, whereby a digital image is generated.

However, to facilitate miniaturization and increase the structural strength of the lens driving mechanism can be difficult. Therefore, addressing the aforementioned problems has become a challenge.

BRIEF SUMMARY OF THE INVENTION

An embodiment of the present invention provides a driving mechanism that includes a fixed part, a movable part, and a driving assembly. The movable part is movably connected to the fixed part for holding an optical element, wherein the optical element defines an optical axis. The driving assembly is configured to drive the movable part to move relative to the fixed part.

In some embodiments, the fixed part has a housing and a base module connected to each other, and the base module includes a quadrilateral main body and a conductive unit embedded in the main body. The conductive unit has a first conductive member, a second conductive member, and a third conductive member. The first, second, and third conductive members respectively have a protrusion exposed to a first side, a second side, and a third side of the main body, the housing and the protrusions are mounted to each other by welding, and the second side is opposite to the third side.

In some embodiments, the driving mechanism further includes a circuit unit disposed on the base module, wherein the first conductive member is electrically connected to a ground point of the circuit unit, and the second and third conductive members are electrically independent from the circuit unit.

In some embodiments, the protrusions of the first, second, and third conductive members are arranged in a triangle.

In some embodiments, the protrusions of the first, second, and third conductive members are arranged in an isosceles triangle.

In some embodiments, the driving mechanism further includes a circuit unit disposed on the base module. The conductive unit further has a plurality of fourth conductive members embedded in the main body, and the fourth conductive members respectively have a terminal bent toward the circuit unit, wherein the terminals are located on a fourth side of the main body and electrically connected to the circuit unit.

In some embodiments, the main body forms a cavity on the fourth side and located between the terminals of the fourth conductive members for receiving adhesive.

In some embodiments, each of the terminals has an L-shaped structure, and a slope surface is formed at the end of the L-shaped structure, wherein the main body encompasses the slope surface.

In some embodiments, the conductive unit further has a plurality of fourth conductive members embedded in the main body. The fourth conductive members respectively have a terminal protruding from the bottom of the main body, wherein the terminals are located close to the first side of the main body, and the first conductive member is located between the terminals of the fourth conductive members.

In some embodiments, the conductive unit further has a fourth conductive member embedded in the main body and located at a corner of the main body. The fourth conductive member forms a flat structure and a conductive pin extending in a horizontal direction that is perpendicular to the optical axis, wherein the flat structure is perpendicular to the optical axis and exposed to a top side of the main body, and the conductive pin is exposed to the fourth side of the main body.

In some embodiments, the main body has two first columns located on the first side, two second columns located on the second side, two third columns located on the third side, and two fourth columns located on the fourth side.

In some embodiments, the distance between the fourth columns is greater than half of the fourth side.

In some embodiments, the driving mechanism further includes a circuit unit positioned between the fourth columns.

In some embodiments, the circuit unit forms a recess for receiving UV-curing adhesive.

In some embodiments, each of the fourth columns forms a groove extending along the optical axis for receiving thermosetting adhesive.

In some embodiments, the driving assembly has a coil disposed on the movable part and a magnet disposed between the second columns.

In some embodiments, the distance between the second columns is greater than half of the second side.

In some embodiments, the distance between the fourth columns is less than the distance between the second columns.

In some embodiments, the driving mechanism further includes two dampers connecting the movable part to the second columns in a first direction, wherein the first direction is perpendicular to the optical axis and the second side.

In some embodiments, the driving mechanism further includes a lower spring sheet connecting the movable part to the main body, wherein the lower spring sheet has a fixed end affixed to the main body, and the dampers and the fixed end do not overlap when viewed along the optical axis.

In some embodiments, the driving mechanism further includes a wire wound on the movable part, wherein the driving assembly has a coil disposed on the movable part and a magnet disposed on the fixed part, and the movable part forms a protrusion, wherein the wire is connected to the coil and extends through a groove formed on the protrusion.

In some embodiments, the driving mechanism further includes an upper spring sheet connecting the movable part to the fixed part, the movable part forms a cavity, and the upper spring sheet forms a through hole communicated with the cavity, wherein the width of the through hole is less than the width of the cavity.

In some embodiments, a rib is formed on a bottom surface of the cavity, and the height of the rib is less than the depth of the cavity.

In some embodiments, a lateral side of the movable part forms a first chamfered portion, a second chamfered portion, and a stepped structure connected between the first and second chamfered portions.

In some embodiments, the radius of the first chamfered portion is greater than the second chamfered portion.

In some embodiments, the radius of the first chamfered portion is greater than 0.1 mm.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The making and using of the embodiments of the driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
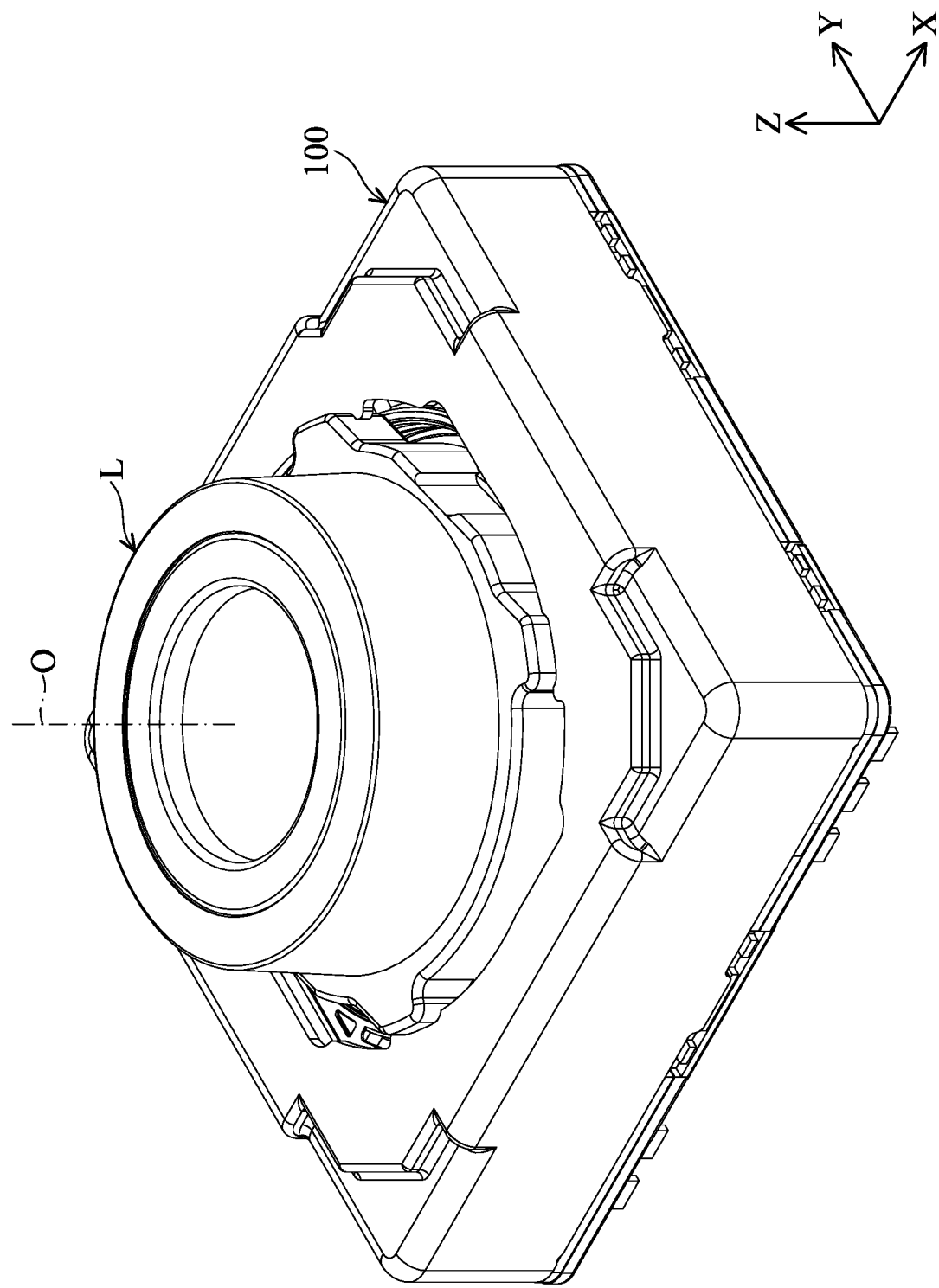
FIG. 1 is a perspective diagram of an optical element L and a driving mechanism 100, in accordance with an embodiment of the invention.
Figure 2:
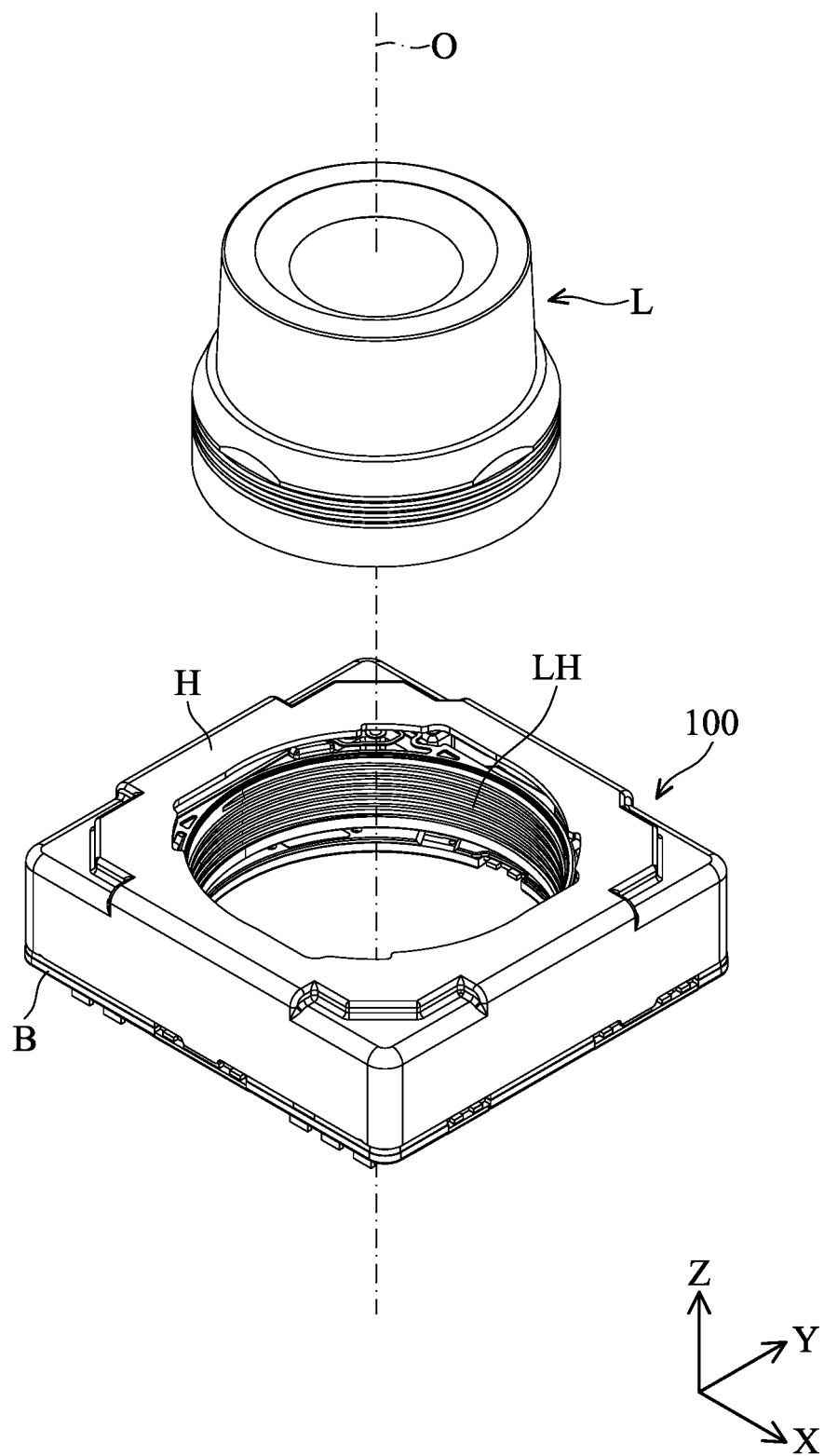
FIG. 2 is an exploded diagram of the optical element L and the driving mechanism 100 in FIG. 1 before assembly.
Figure 3:
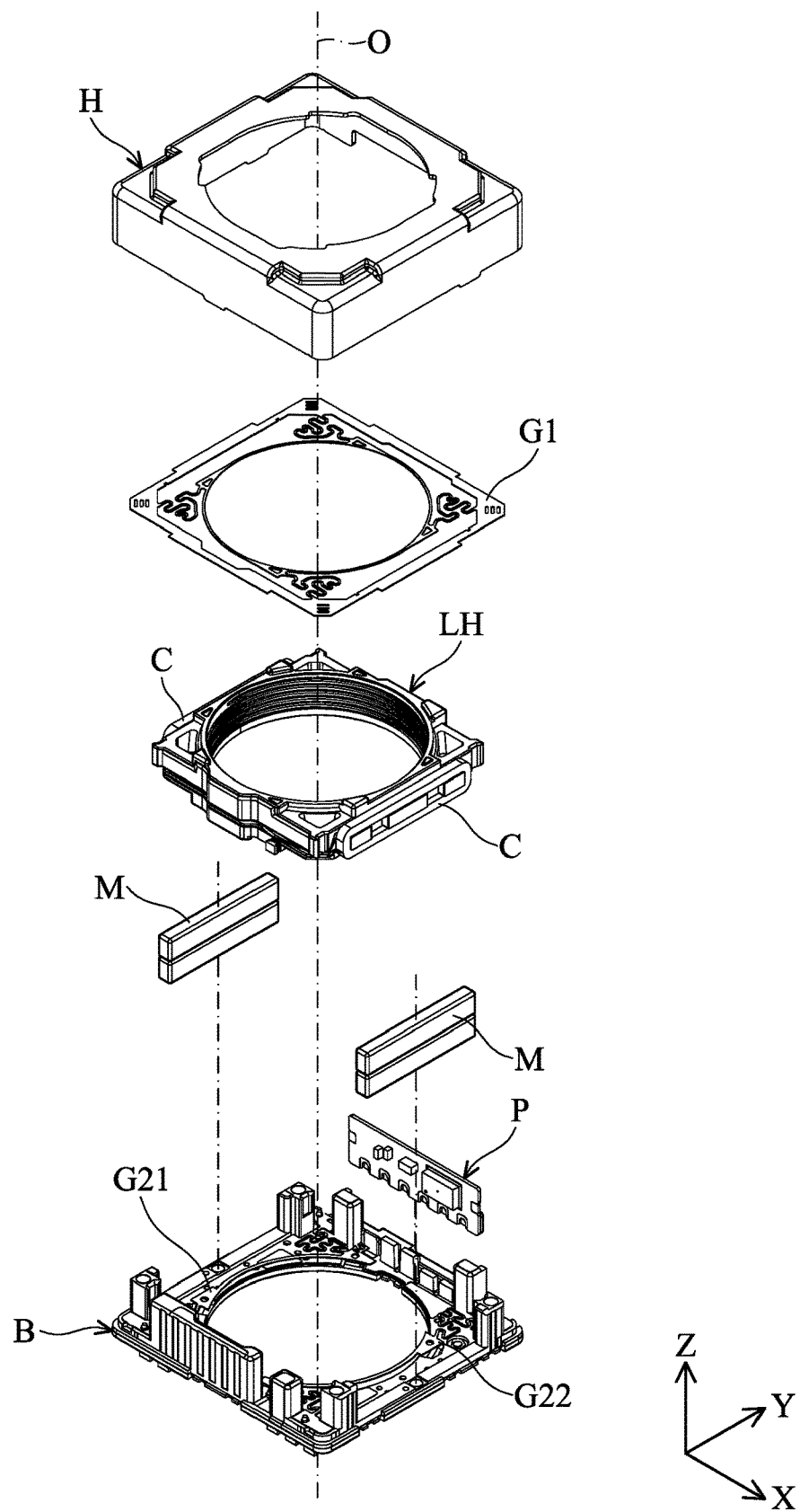
FIG. 3 is an exploded diagram of the driving mechanism 100 in FIGS. 1 and 2.

FIG. 1 is a perspective diagram of an optical element L and a driving mechanism 100, in accordance with an embodiment of the invention. FIG. 2 is an exploded diagram of the optical element L and the driving mechanism 100 in FIG. 1 before assembly. FIG. 3 is an exploded diagram of the driving mechanism 100 in FIGS. 1 and 2.

Referring to FIGS. 1-3, an optical element L (e.g. optical lens) is disposed in a driving mechanism 100 to form an optical system. In this embodiment, the driving mechanism 100 primarily comprises a housing H, an upper spring sheet G1, a holder LH, at least a coil C, at least a magnetic element M, a circuit unit P, a base module B, and two lower spring sheets G21 and G22 disposed on the base module B, wherein the optical element L is secured in the holder LH.

The housing H and the base module B constitute a fixed part of the driving mechanism 100. The holder LH (movable part) is connected to the housing H via the upper spring sheet G1, and the holder LH is connected to the base module B via the lower spring sheets G21 and G22. Therefore, the holder LH can move relative to the fixed part (the housing H and the base module B) along an optical axis O of the optical element L that is parallel to the Z axis, whereby Auto-Focusing (AF) and Optical Image Stabilization (OIS) of the optical system can be achieved.

In this embodiment, two coils C are disposed on opposite sides of the holder LH, and two magnetic elements M (e.g. magnets) are affixed to the base module B and located adjacent to the coils C. The coils C and the magnetic elements M constitute a driving assembly of the driving mechanism 100, and when the coils C are energized, the coils C and the magnetic elements M can generate an electromagnetic force, whereby the optical element L and the holder LH are impelled to move relative to the fixed part along the optical axis O (Z axis).

Figure 4:
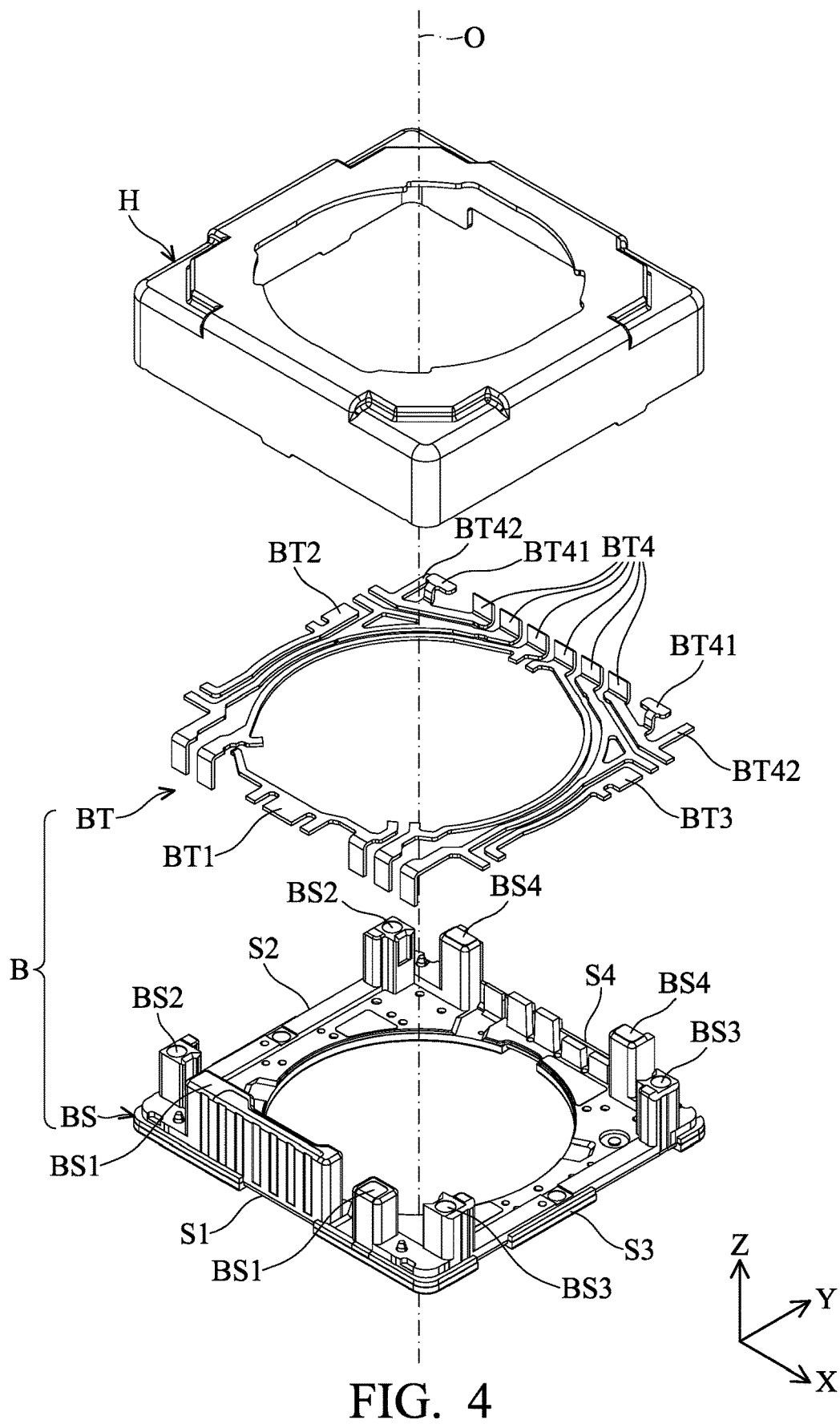
FIG. 4 is an exploded diagram of the base module B and the housing H in FIG. 3.
Figure 5:
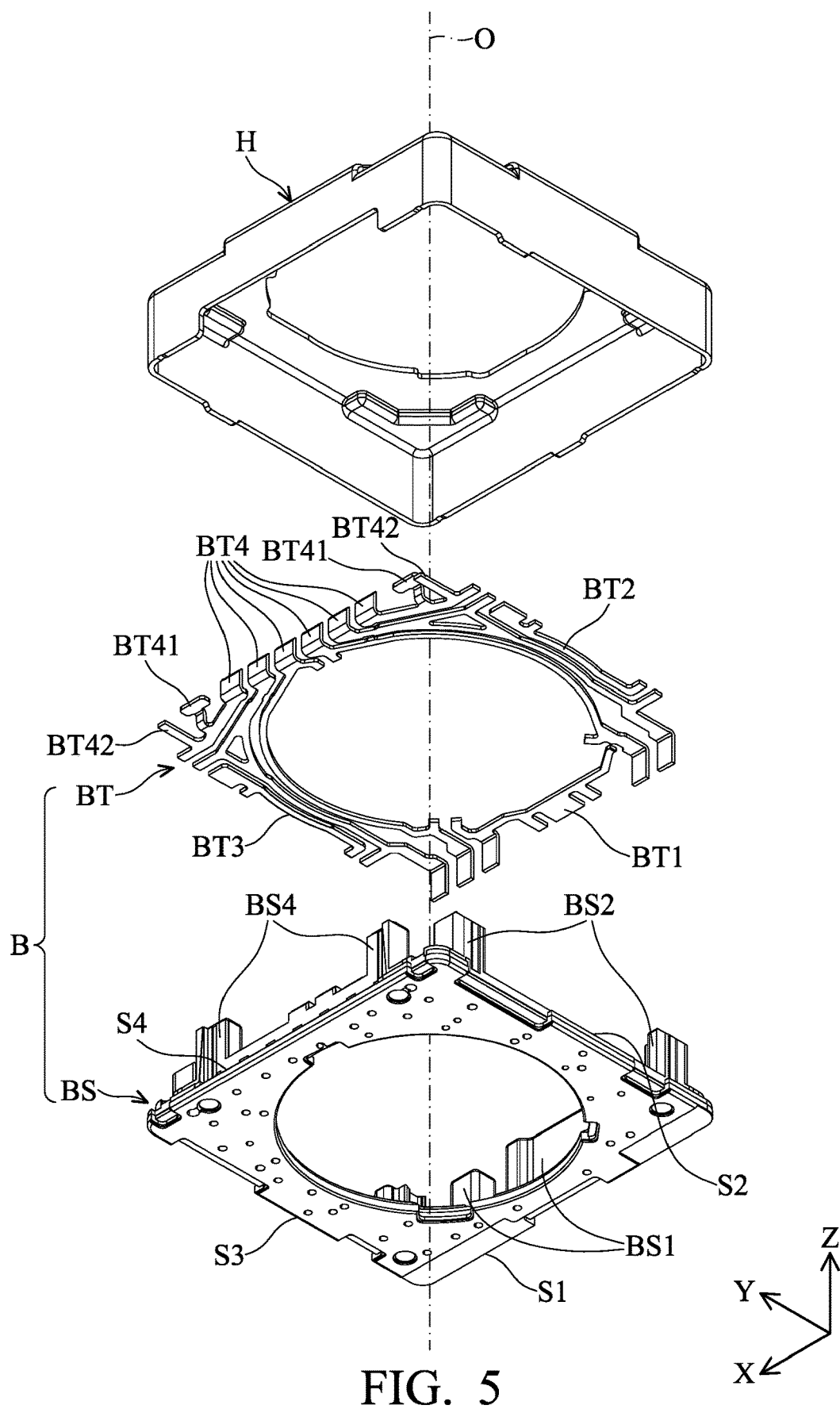
FIG. 5 is another exploded diagram of the base module B and the housing H in FIG. 3.
Figure 6:
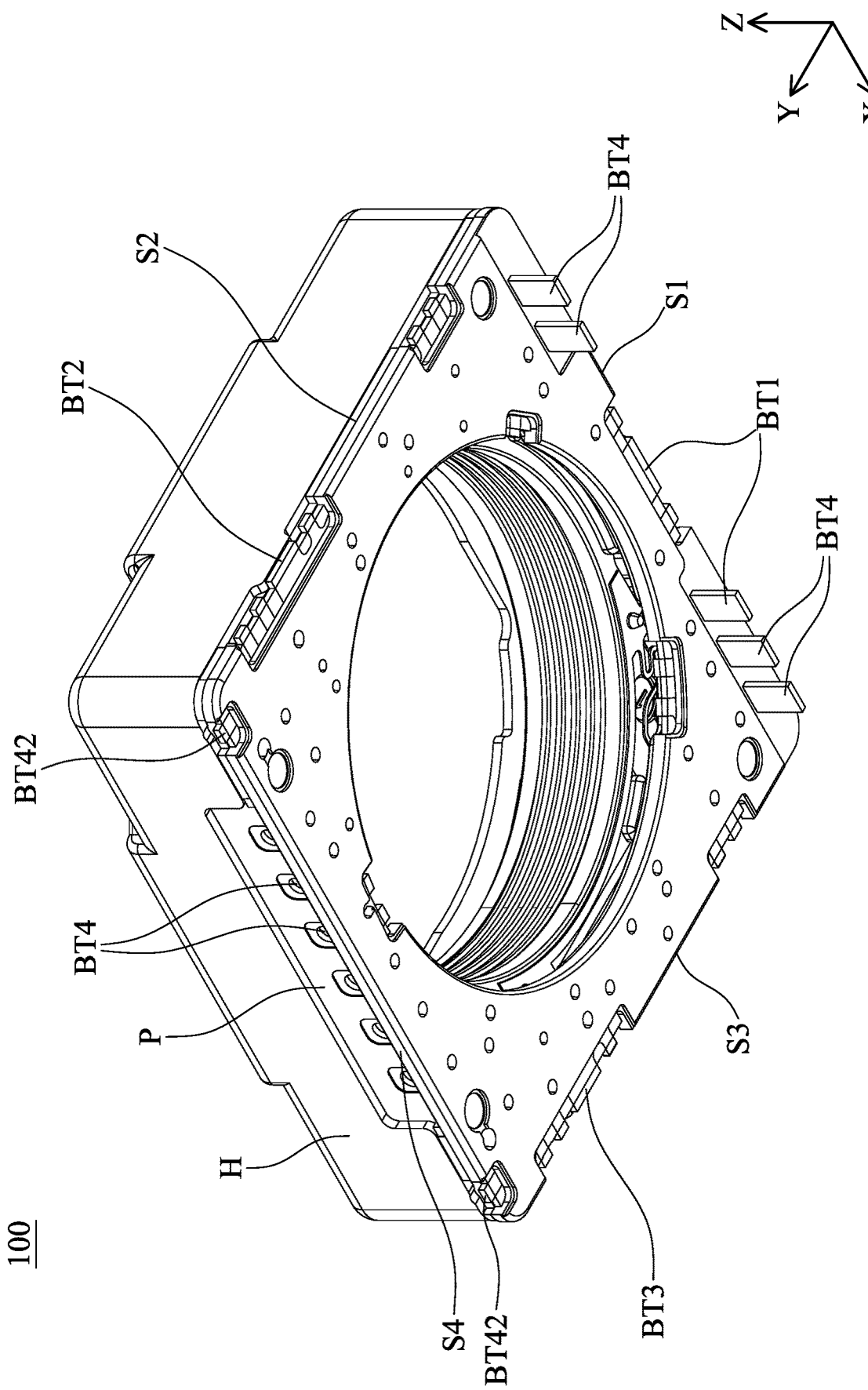
FIG. 6 is a perspective diagram of the driving mechanism 100 in FIGS. 1 and 2.
Figure 7:
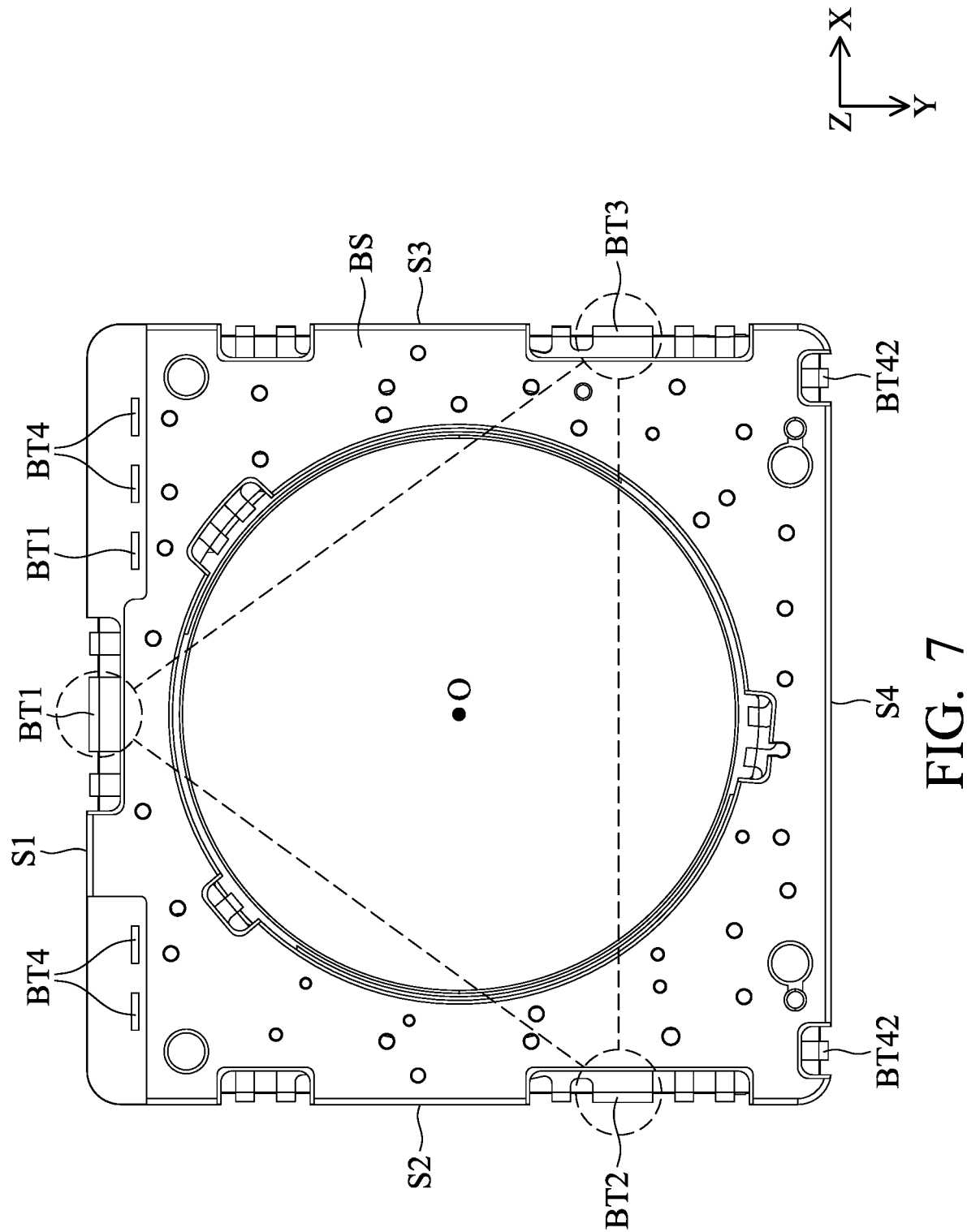
FIG. 7 is a bottom view of the first, second, and third conductive members BT1, BT2, and BT3 exposed to the first, second, and third sides S1, S2, and S3 of the main body BS.

FIG. 4 is an exploded diagram of the base module B and the housing H in FIG. 3. FIG. 5 is another exploded diagram of the base module B and the housing H in FIG. 3. FIG. 6 is a perspective diagram of the driving mechanism 100 in FIGS. 1 and 2. FIG. 7 is a bottom view of the first, second, and third conductive members BT1, BT2, and BT3 exposed to the first, second, and third sides S1, S2, and S3 of the main body BS.

Referring to FIGS. 4-7, the base module B comprises a plastic main body BS and a metal conductive unit BT. The conductive unit BT includes a first conductive member BT1, a second conductive member BT2, a third conductive member BT3, and a plurality of fourth conductive members BT4. The first, second, third, and fourth conductive members BT1, BT2, BT3, and BT4 are embedded in the main body BS by plastic insert molding, thus enhancing the structural strength of the base module B and facilitating miniaturization of the driving mechanism 100.

In this embodiment, the first, second, and third conductive members BT1, BT2, and BT3 are respectively located on the first, second, and third sides S1, S2, and S3 of the quadrilateral main body BS. Each of the fourth conductive members BT4 has a terminal located on the fourth side S4 of the main body BS and bent toward the circuit unit P, wherein the terminals of the fourth conductive members BT4 are electrically connected to the circuit unit P (e.g. PCB).

It should be noted that each of the fourth conductive members BT4 further has a terminal protruding from the bottom of the main body BS and located close to the first side S1 of the main body BS (FIGS. 6 and 7), wherein the first conductive member BT1 is located between the terminals of the fourth conductive members BT4.

Specifically, two of the fourth conductive members BT4 at the corners of the main body BS respectively have a flat structure BT41 and a conductive pin BT42 extending in a horizontal direction (Y direction) that is perpendicular to the optical axis O. The flat structure BT41 is perpendicular to the optical axis O and exposed to the top side of the main body BS. The conductive pin BT42 is exposed to the fourth side S4 of the main body BS and electrically connected to an external circuit.

It can be seen in FIG. 7 that each of the first, second, and third conductive members BT1, BT2, and BT3 has a protrusion respectively exposed to the first, second, and third sides S1, S2, and S3 of the main body BS. Here, the first, second, and third conductive members BT1, BT2, and BT3 are arranged in a triangle (e.g. isosceles triangle).

During assembly of the driving mechanism 100, the metal housing H and the protrusions of the first, second, and third conductive members BT1, BT2, and BT3 can be mounted to each other by welding (e.g. laser welding), thereby enhancing the structural strength of the driving mechanism 100 and facilitating miniaturization of the driving mechanism 100.

In this embodiment, the first conductive member BT1 may be electrically connected to a ground point of the circuit unit P, and the second and third conductive members BT2 and BT3 are electrically independent from the circuit unit P and isolated from any other circuit.

Figure 8:
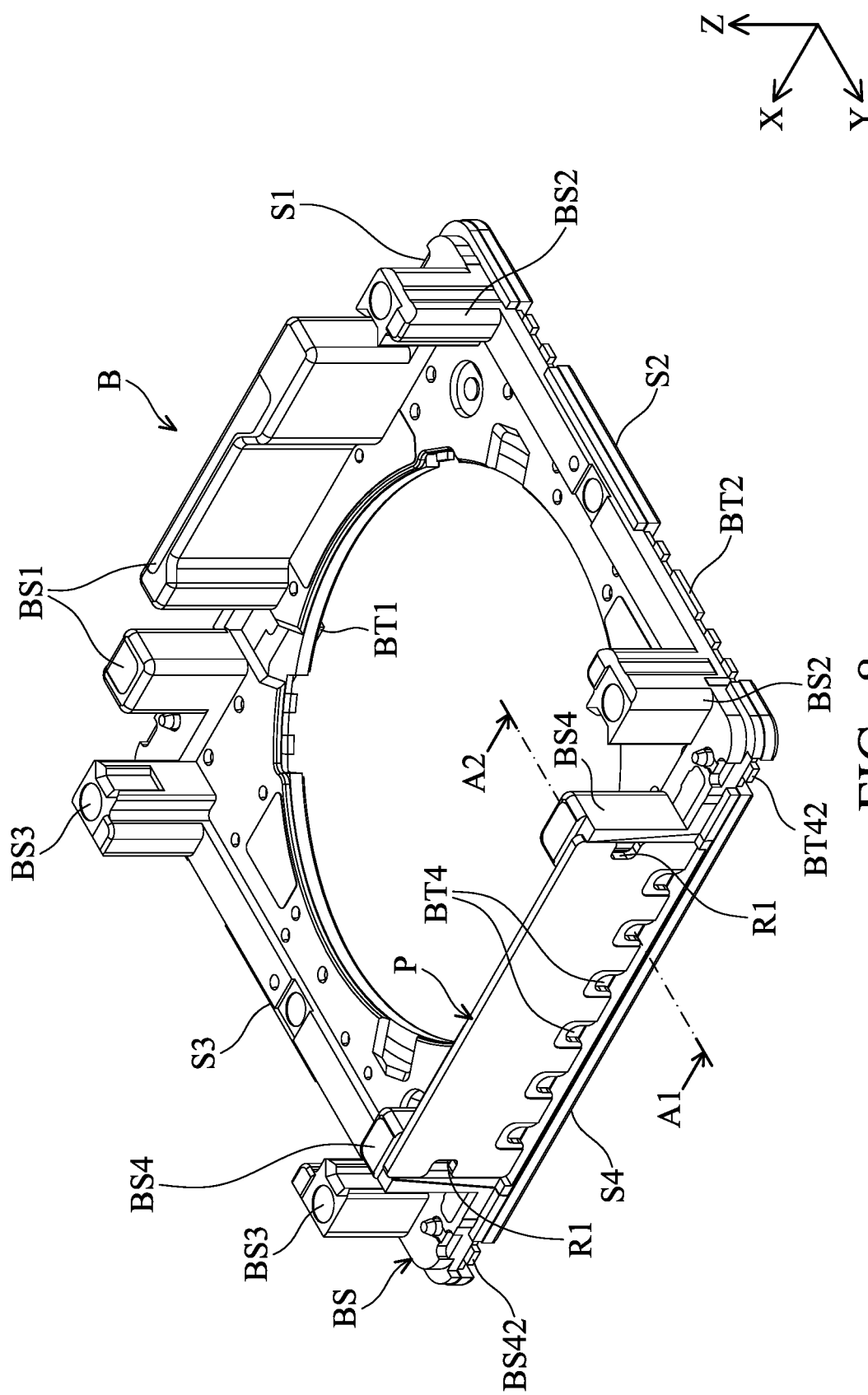
FIG. 8 is a perspective diagram of the circuit unit P and the base module B in FIG. 3 after assembly.
Figure 9:
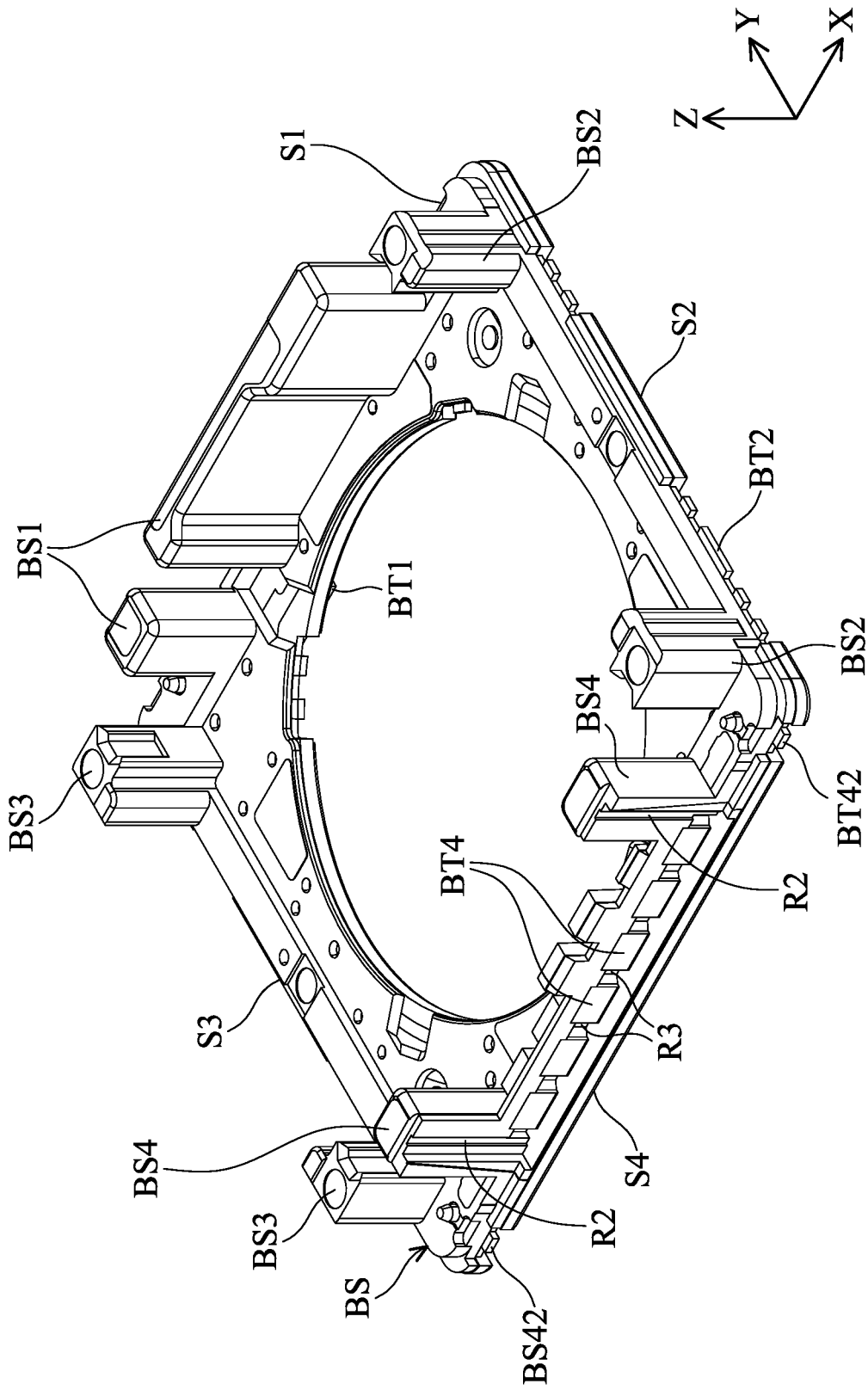
FIG. 9 is perspective diagram of the base module B in FIG. 8.
Figure 10:
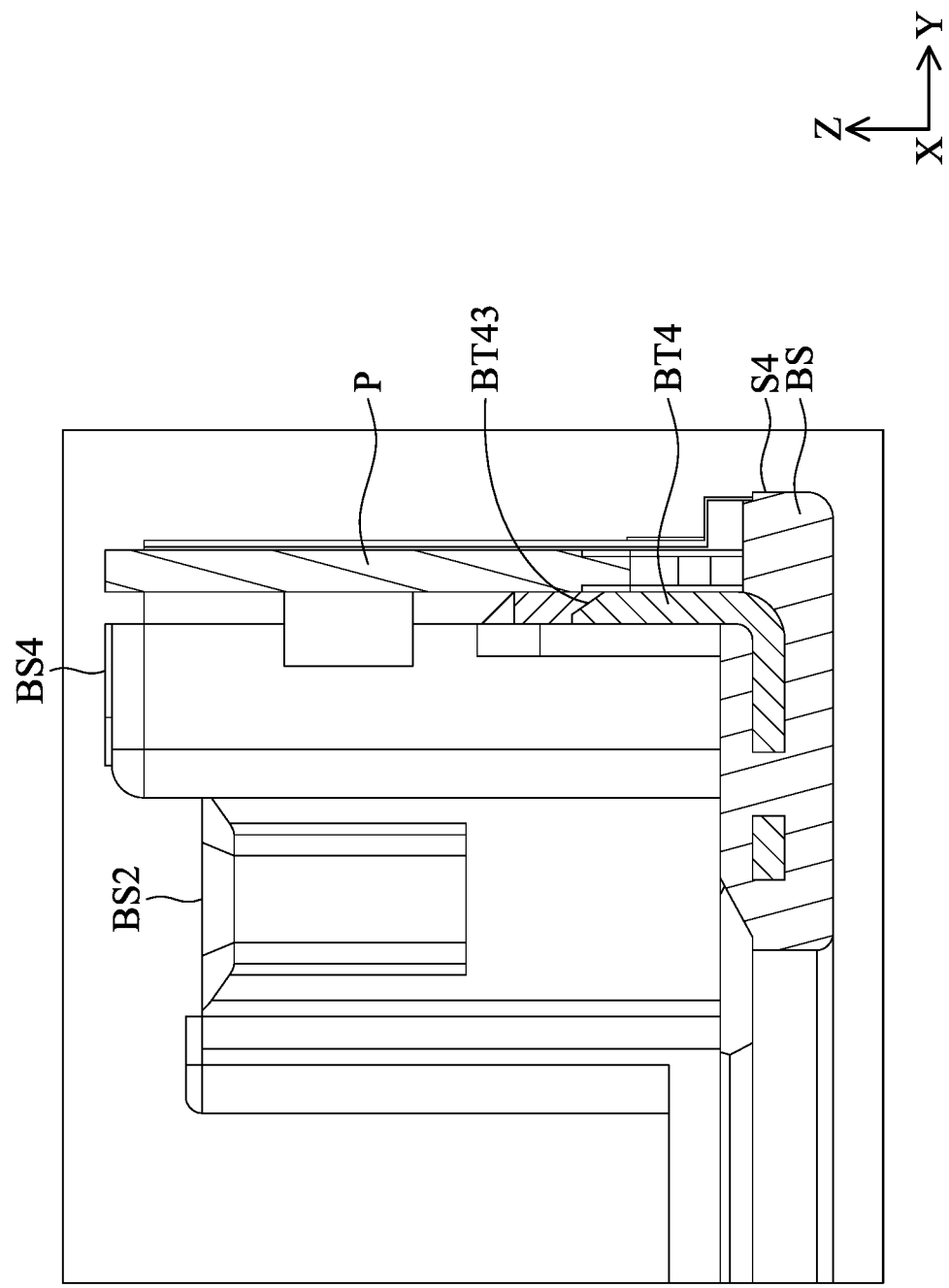
FIG. 10 is a cross-sectional view along line A1-A2 in FIG. 8.

FIG. 8 is a perspective diagram of the circuit unit P and the base module B in FIG. 3 after assembly. FIG. 9 is perspective diagram of the base module B in FIG. 8. FIG. 10 is a cross-sectional view along line A1-A2 in FIG. 8.

Referring to FIGS. 4, 5, 8, and 9, two first columns BS1 are formed on the first side S1 of the main body BS, two second columns BS2 are formed on the second side S2 of the main body BS, two third columns BS3 are formed on the third side S3 of the main body BS, and two fourth columns BS4 are formed on the fourth side S4 of the main body BS. The first, second, third, and fourth columns BS1, BS2, BS3, and BS4 extend along the Z axis, and the circuit unit P is joined in the space between the fourth columns BS4.

In this embodiment, the distance between the second columns BS2 is greater than half of the second side S2 for receiving one of the magnetic elements M. Similarly, the distance between the third columns BS3 is greater than half of the third side S3 for receiving the other magnetic element M. Moreover, the distance between the fourth columns BS4 is greater than half of the fourth side S4 for receiving the circuit unit P.

The circuit unit P forms a recess R1 (FIG. 8) for receiving UV-curing adhesive. Each of the fourth columns BS4 forms a groove R2 (FIG. 9) extending along the Z axis for receiving thermosetting adhesive. Therefore, the connection strength between the circuit unit P and the base module B can be increased, and the reliability of the driving mechanism 100 can also be improved.

As shown in FIG. 9, at least a cavity R3 is formed on the fourth side S4 of the main body BS and located between the terminals of the fourth conductive members BT4. The cavities R3 are configured to receive adhesive or glue, thereby enhancing the connection strength between the circuit unit P and the base module B.

Referring to FIG. 10, each fourth conductive member BT4 has an L-shaped terminal, and a slope surface BT43 is formed at the end of the L-shaped terminal. In this embodiment, the slope surface BT43 is encompassed by the main body BS, whereby the fourth conductive member BT4 can be prevented from peeling or protruding from the fourth side S4 of the main body BS. Moreover, short circuit of the fourth conductive members BT4 and other components in the driving mechanism 100 can also be avoided.

Figure 11:
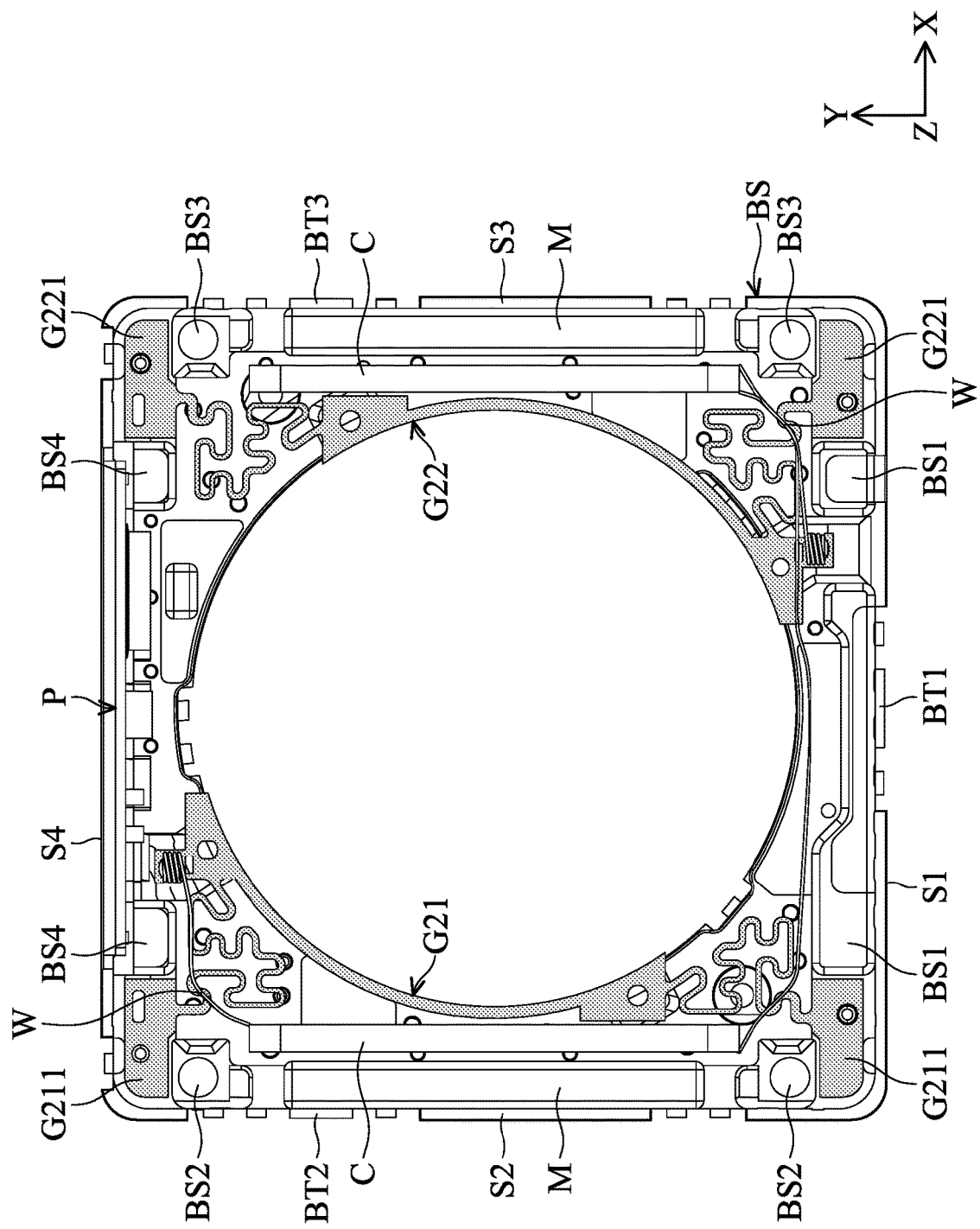
FIG. 11 is a top view of the driving mechanism 100 when the housing H, the upper spring sheet G1, and the holder LH are omitted.
Figure 12:
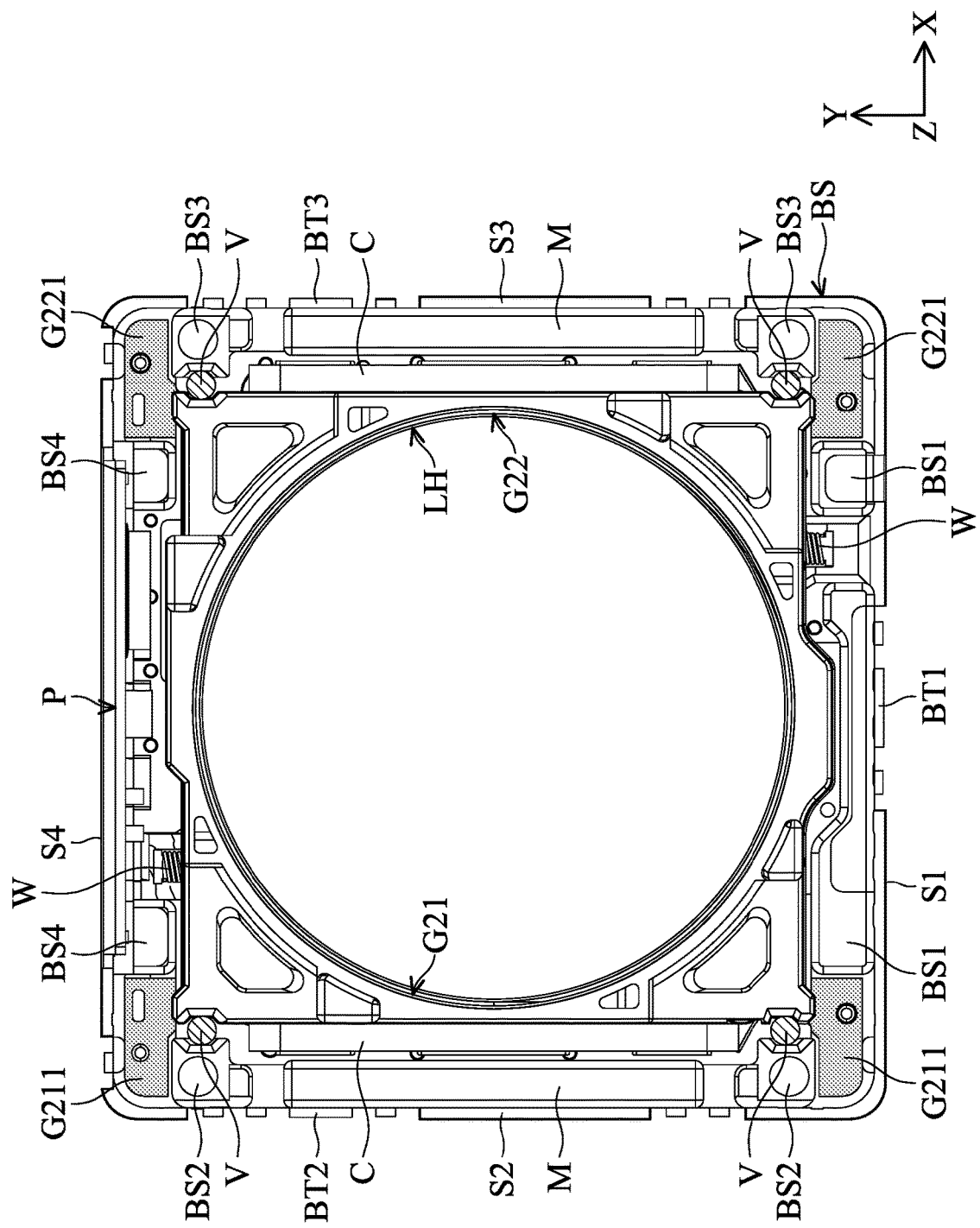
FIG. 12 is a top view of the driving mechanism 100 when the housing H and the upper spring sheet G1 are omitted, wherein a plurality of dampers V are disposed between the holder LH and the main body BS of the base module B.

FIG. 11 is a top view of the driving mechanism 100 when the housing H, the upper spring sheet G1, and the holder LH are omitted. FIG. 12 is a top view of the driving mechanism 100 when the housing H and the upper spring sheet G1 are omitted, wherein a plurality of dampers V are disposed between the holder LH and the main body BS of the base module B.

As shown in FIGS. 11 and 12, the lower spring sheet G21 has two fixed ends G211, and the lower spring sheet G22 has two fixed ends G221. The fixed ends G211 and G221 are affixed to the four corners of the main body BS, and two curved inner portions of the lower spring sheets G21 and G22 are connected to the holder LH.

During assembly of the driving mechanism 100, several dampers V are disposed between the holder LH and the main body BS of the base module B. In some embodiments, the dampers V may comprise gel to prevent the holder LH from direct collision with the main body BS of the base module B in a first direction that is parallel to the X axis.

It should be noted that two of the dampers V are connected between the second columns BS2 and the main body BS of the base module B along the first direction (parallel to the X axis), and the other two dampers V are connected between the main body BS of the base module B and the third columns BS3 along the first direction (parallel to the X axis). Specifically, the dampers V and the fixed ends G211 and G221 do not overlap when viewed along the Z axis.

Still referring to FIGS. 11 and 12, the distance between the fourth columns BS4 is less than the distance between the second columns BS2. The driving assembly (including the coils C and the magnetic elements M) is disposed on the second and third sides S2 and S3 of the main body BS, and the first direction is parallel to the X axis and perpendicular to the second and third sides S2 and S3.

When the holder LH moves relative to the base module B in the X or −X direction, the magnetic elements M can be used as stoppers to contact and restrict the holder LH within a specific range. Additionally, when the holder LH moves relative to the base module B in the Y or −Y direction, the first and fourth columns BS1 and BS4 can be used as stoppers to contact and restrict the holder LH within a specific range.

Figure 13:
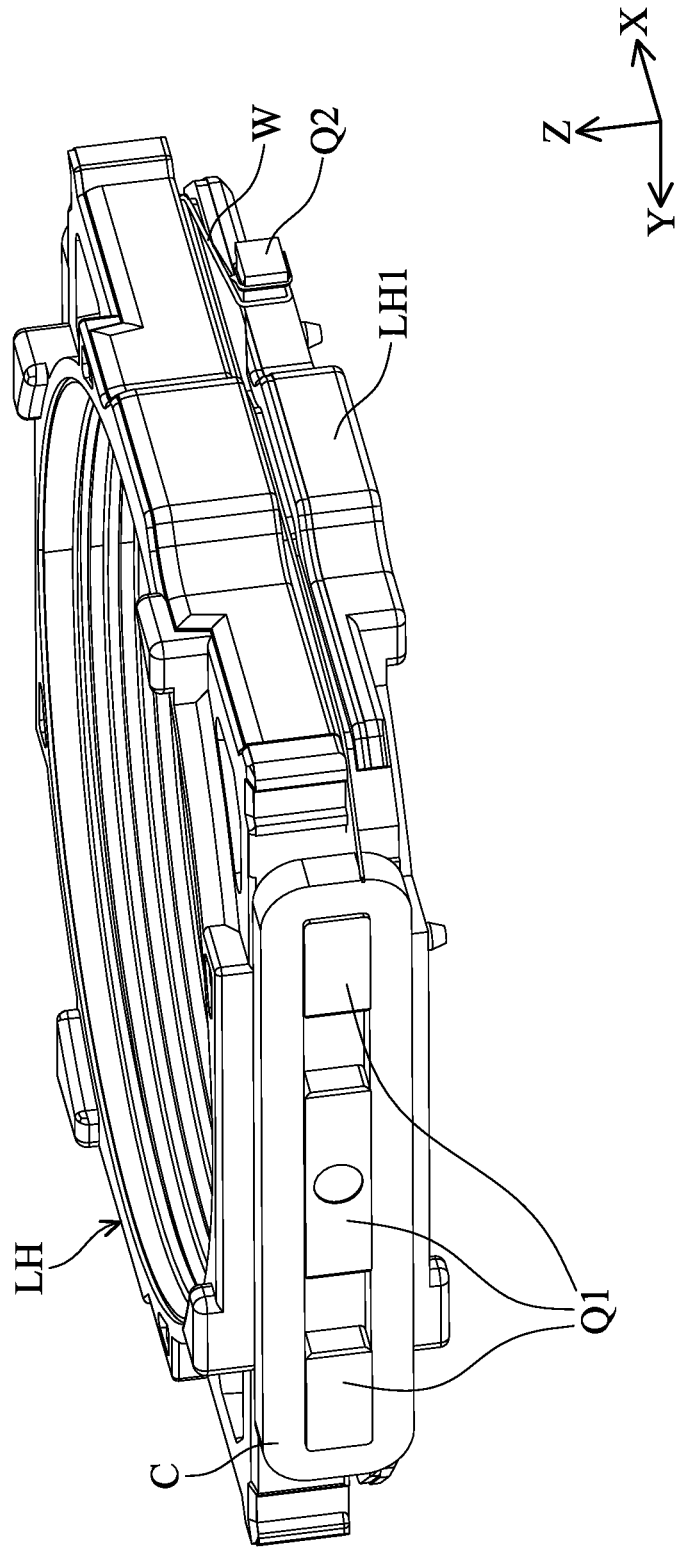
FIG. 13 is a perspective diagram of a wire W connected to the coil C and wound on a leg Q2 of the holder LH.

FIG. 13 is a perspective diagram of a wire W connected to the coil C and wound on a leg Q2 of the holder LH.

As shown in FIG. 13, one of the coils C is wound around a bobbin structure Q1, wherein the bobbin structure Q1 includes a plurality of protrusions formed on a lateral side of the holder LH. It should be noted that the length of the magnetic element M is less than the length of the bobbin structure Q1. Additionally, the wire W is connected to the coil C and wound on the leg Q2 of holder LH. In this embodiment, a protrusion LH1 is formed on a lateral side of the holder LH, and the wire W extends through the groove formed on the protrusion LH1. Therefore, a tensional force can be applied to the wire W, and the wire W can be stably wound on the holder LH.

Figure 14:
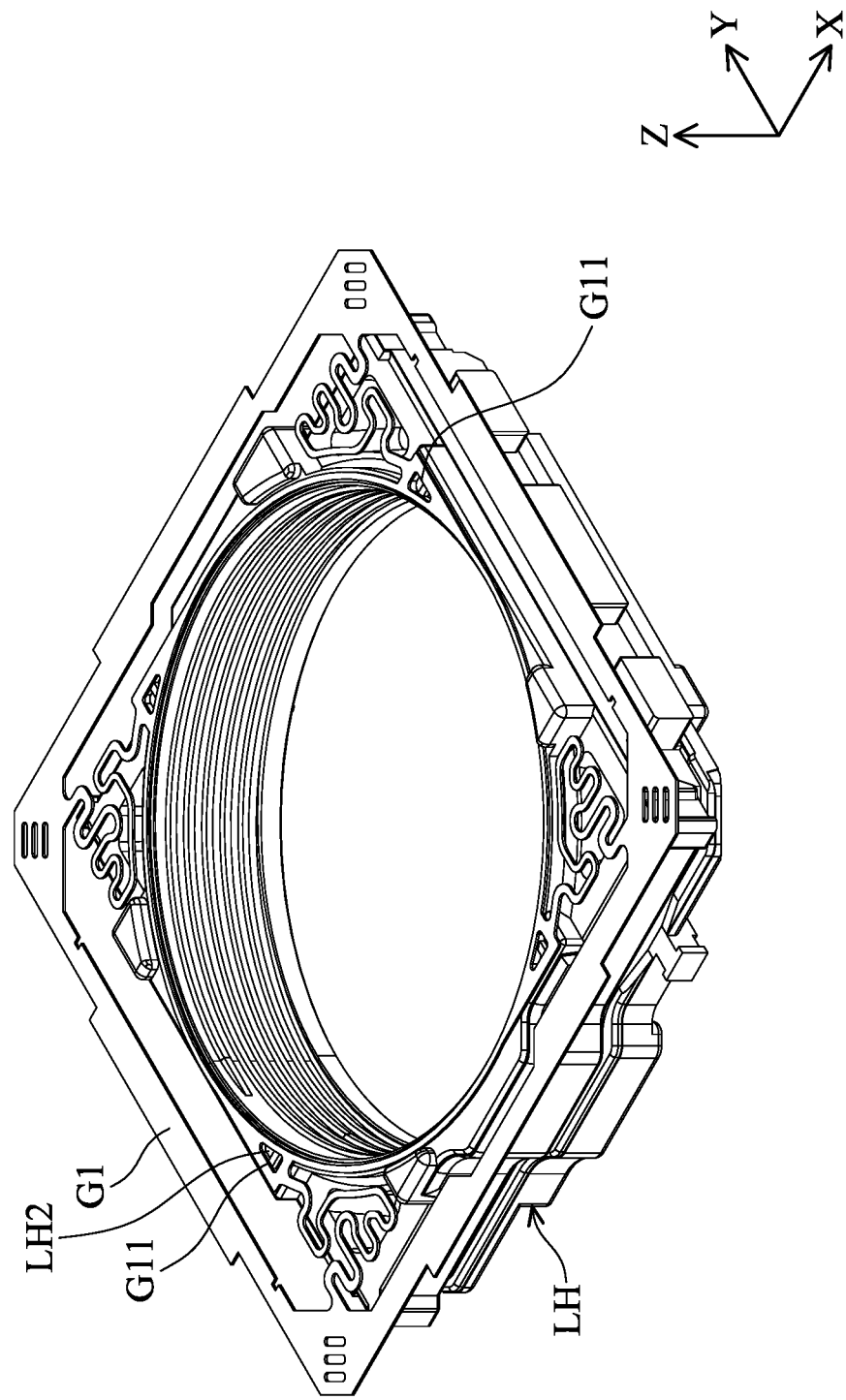
FIG. 14 is a perspective diagram of the holder LH and the upper spring sheet G1 disposed on the holder LH.
Figure 15:
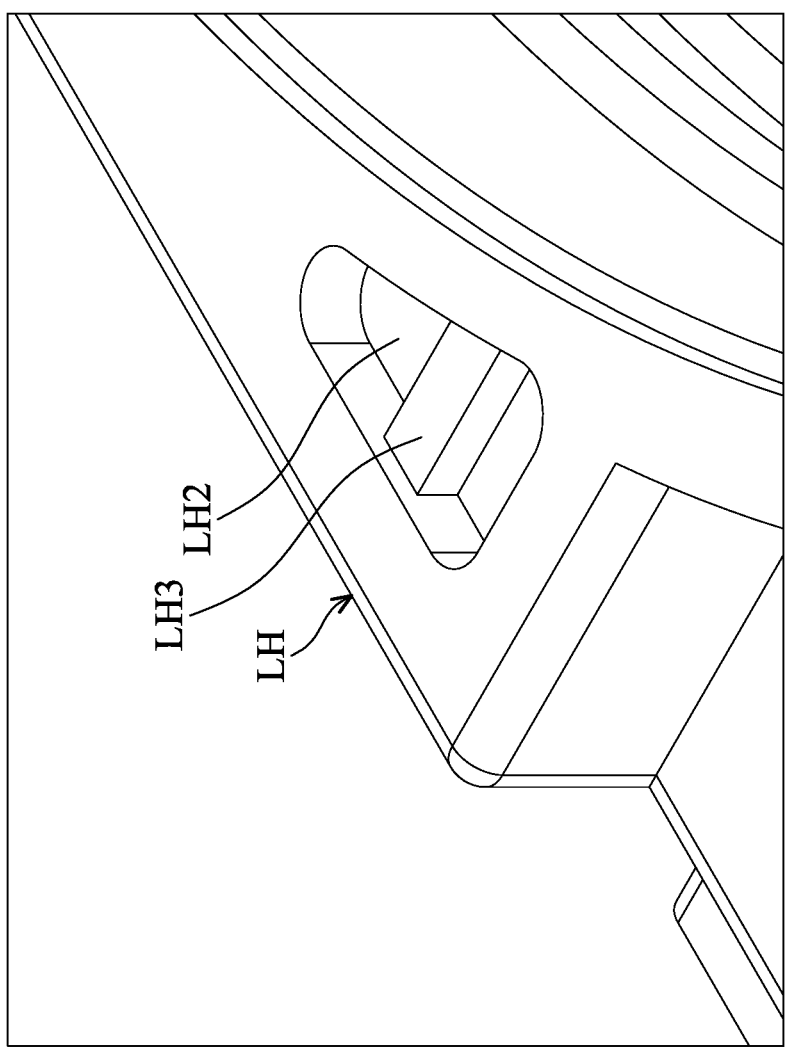
FIG. 15 is a partial enlarged view of the cavity LH2 of the holder LH.
Figure 16:
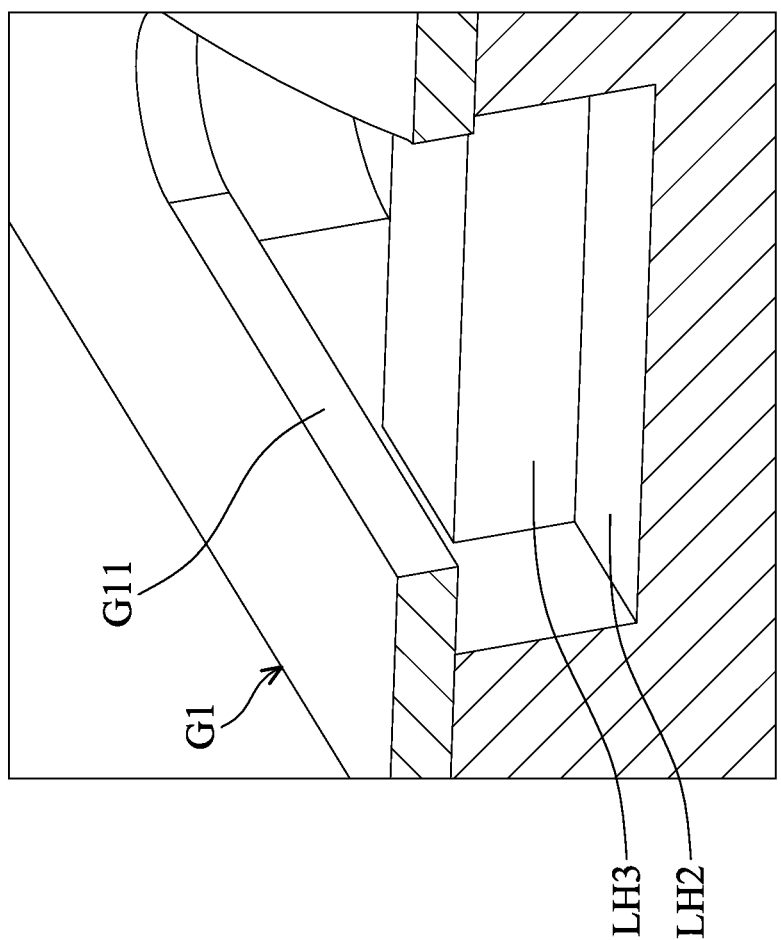
FIG. 16 is a cross-sectional view of the holder LH and the upper spring sheet G1, wherein the width of the through hole Gil of the upper spring sheet G1 is less than the width of the cavity LH2 of the holder LH.

FIG. 14 is a perspective diagram of the holder LH and the upper spring sheet G1 disposed on the holder LH. FIG. 15 is a partial enlarged view of the cavity LH2 of the holder LH. FIG. 16 is a cross-sectional view of the holder LH and the upper spring sheet G1, wherein the width of the through hole Gil of the upper spring sheet G1 is less than the width of the cavity LH2 of the holder LH.

As shown in FIGS. 14-16, a cavity LH2 is formed on the top surface of the holder LH, and a through hole Gil is formed on the upper spring sheet G1. The cavity LH2 is communicated with the through hole Gil for receiving adhesive, and the width of the through hole Gil of the upper spring sheet G1 is less than the width of the cavity LH2 of the holder LH. Specifically, at least a rib LH3 is formed on the bottom surface of the cavity LH2, and the height of the rib LH3 is less than the depth of the cavity LH2.

It should be noted that the rib LH3 can increase the contact area between the adhesive and the holder LH, thereby enhancing the connection strength between the holder LH and the upper spring sheet G1.

Figure 17:
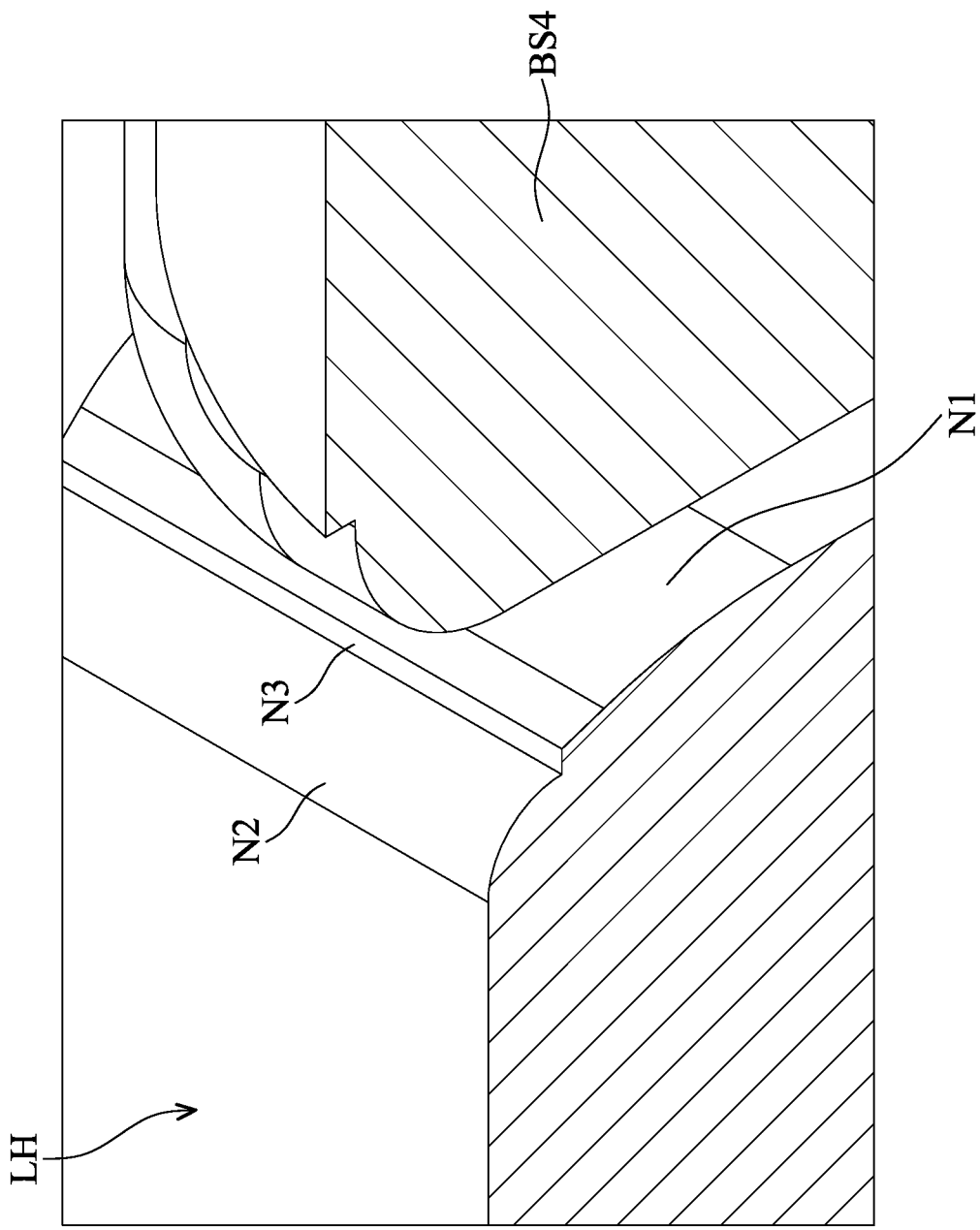
FIG. 17 a partial enlarged cross-sectional view of the fourth column BS4 and the holder LH.

FIG. 17 a partial enlarged cross-sectional view of the fourth column BS4 and the holder LH.

As shown in FIG. 17, a lateral side of the holder LH forms a first chamfered portion N1, a second chamfered portion N2, and a stepped structure N3 connected between the first and second chamfered portions N1 and N2. In this embodiment, the radius of the first chamfered portion N1 is greater than the second chamfered portion N2.

With the stepped structure N3 connected between the first and second chamfered portions N1 and N2, flash and burrs on the parting surface after the plastic injection molding can be efficiently reduced. Moreover, the holder LH can collide with the fourth column BS4 via the first chamfered portion N1 that has a contact surface smoother than the second chamfered portion N2, whereby particles may not be generated due to the collision of the holder LH and the fourth column BS4. In this embodiment, the radius of the first chamfered portion N1 is greater than 0.1 mm.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A driving mechanism, comprising:
   a fixed part;
   a movable part, movably connected to the fixed part for holding an optical element, wherein the optical element defines an optical axis;
   a driving assembly, configured to drive the movable part to move relative to the fixed part; and
   an upper spring sheet, connecting the movable part to the fixed part, wherein the movable part forms a first cavity, the upper spring sheet forms a through hole communicated with the first cavity, and the width of the through hole is less than the width of the first cavity;
   wherein a rib is formed on a bottom surface of the first cavity, and the height of the rib is less than the depth of the first cavity.

2. The driving mechanism as claimed in claim 1, wherein the fixed part has a housing and a base module connected to each other, the base module includes a quadrilateral main body and a conductive unit embedded in the main body, and the conductive unit has a first conductive member, a second conductive member, and a third conductive member, wherein the first, second, and third conductive members respectively have a protrusion exposed to a first side, a second side, and a third side of the main body, the housing and the protrusions are mounted to each other by welding, and the second side is opposite to the third side.

3. The driving mechanism as claimed in claim 2, further comprising a circuit unit disposed on the base module, wherein the first conductive member is electrically connected to a ground point of the circuit unit, and the second and third conductive members are electrically independent from the circuit unit.

4. The driving mechanism as claimed in claim 3, wherein the protrusions of the first, second, and third conductive members are arranged in a triangle.

5. The driving mechanism as claimed in claim 4, wherein the protrusions of the first, second, and third conductive members are arranged in an isosceles triangle.

6. The driving mechanism as claimed in claim 2, further comprising a circuit unit disposed on the base module, wherein the conductive unit further has a plurality of fourth conductive members embedded in the main body, and the fourth conductive members respectively have a terminal bent toward the circuit unit, wherein the terminals are located on a fourth side of the main body and electrically connected to the circuit unit.

7. The driving mechanism as claimed in claim 6, wherein the main body forms a second cavity on the fourth side and located between the terminals of the fourth conductive members for receiving adhesive.

8. The driving mechanism as claimed in claim 6, wherein each of the terminals has an L-shaped structure, and a slope surface is formed at the end of the L-shaped structure, wherein the main body encompasses the slope surface.

9. The driving mechanism as claimed in claim 2, wherein the conductive unit further has a plurality of fourth conductive members embedded in the main body, and the fourth conductive members respectively have a terminal protruding from the bottom of the main body, wherein the terminals are located close to the first side of the main body, and the first conductive member is located between the terminals of the fourth conductive members.

10. The driving mechanism as claimed in claim 2, wherein the conductive unit further has a fourth conductive member embedded in the main body and located at a corner of the main body, and the fourth conductive member forms a flat structure and a conductive pin extending in a horizontal direction that is perpendicular to the optical axis, wherein the flat structure is perpendicular to the optical axis and exposed to a top side of the main body, and the conductive pin is exposed to the fourth side of the main body.

11. The driving mechanism as claimed in claim 2, wherein the main body has two first columns located on the first side, two second columns located on the second side, two third columns located on the third side, and two fourth columns located on the fourth side.

12. The driving mechanism as claimed in claim 11, wherein the distance between the fourth columns is greater than half of the fourth side.

13. The driving mechanism as claimed in claim 12, further comprising a circuit unit positioned between the fourth columns.

14. The driving mechanism as claimed in claim 13, wherein the circuit unit forms a recess for receiving UV-curing adhesive.

15. The driving mechanism as claimed in claim 14, wherein each of the fourth columns forms a groove extending along the optical axis for receiving thermosetting adhesive.

16. The driving mechanism as claimed in claim 11, wherein the driving assembly has a coil disposed on the movable part and a magnet disposed between the second columns.

17. The driving mechanism as claimed in claim 16, wherein the distance between the second columns is greater than half of the second side.

18. The driving mechanism as claimed in claim 16, wherein the distance between the fourth columns is less than the distance between the second columns.

19. The driving mechanism as claimed in claim 16, further comprising two dampers connecting the movable part to the second columns in a first direction, wherein the first direction is perpendicular to the optical axis and the second side.

20. The driving mechanism as claimed in claim 19, further comprising a lower spring sheet connecting the movable part to the main body, wherein the lower spring sheet has a fixed end affixed to the main body, and the dampers and the fixed end do not overlap when viewed along the optical axis.

21. The driving mechanism as claimed in claim 1, further comprising a wire wound on the movable part, wherein the driving assembly has a coil disposed on the movable part and a magnet disposed on the fixed part, and the movable part forms a protrusion, wherein the wire is connected to the coil and extends through a groove formed on the protrusion.

22. The driving mechanism as claimed in claim 1, wherein a lateral side of the movable part forms a first chamfered portion, a second chamfered portion, and a stepped structure connected between the first and second chamfered portions.

23. The driving mechanism as claimed in claim 22, wherein the radius of the first chamfered portion is greater than the second chamfered portion.

24. The driving mechanism as claimed in claim 23, wherein the radius of the first chamfered portion is greater than 0.1 mm.

* * * * *